(No Model.) 3 Sheets—Sheet 3.
F. L. DESMOINEAUX.
RAIL BRAKE.
No. 536,459. Patented Mar. 26, 1895.
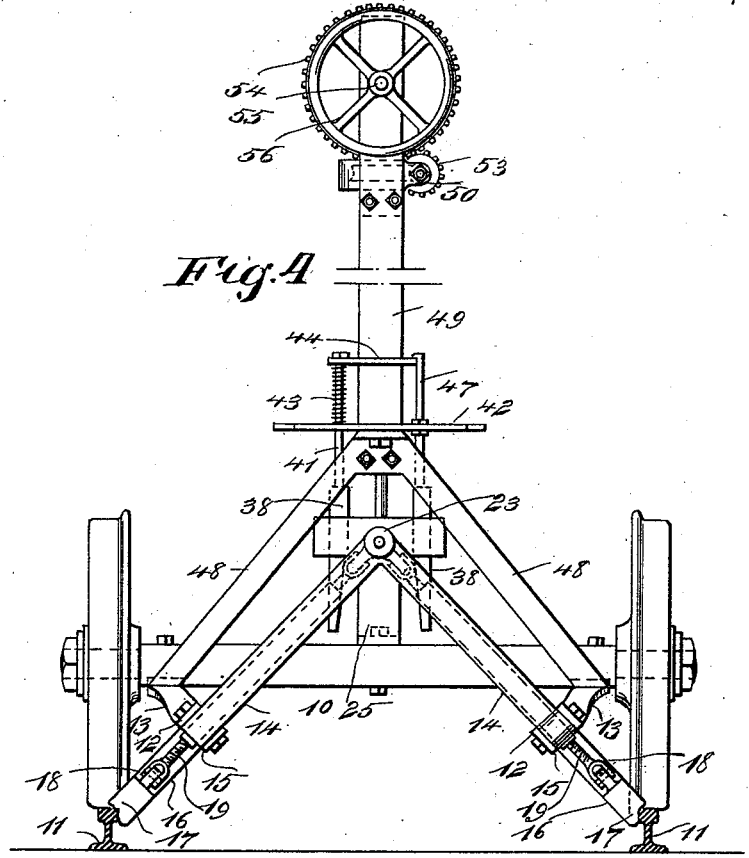
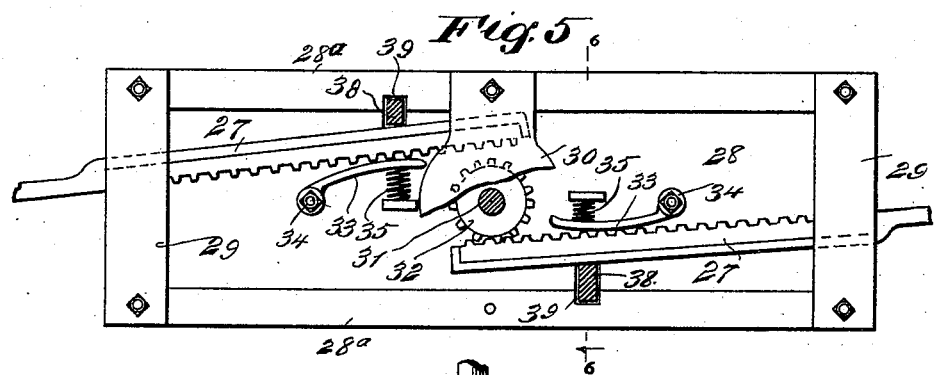
WITNESSES:
Johna Bergstrom
W. P. Hutchinson
INVENTOR
F. L. Desmoineaux
BY
Munn & Co
ATTORNEYS.

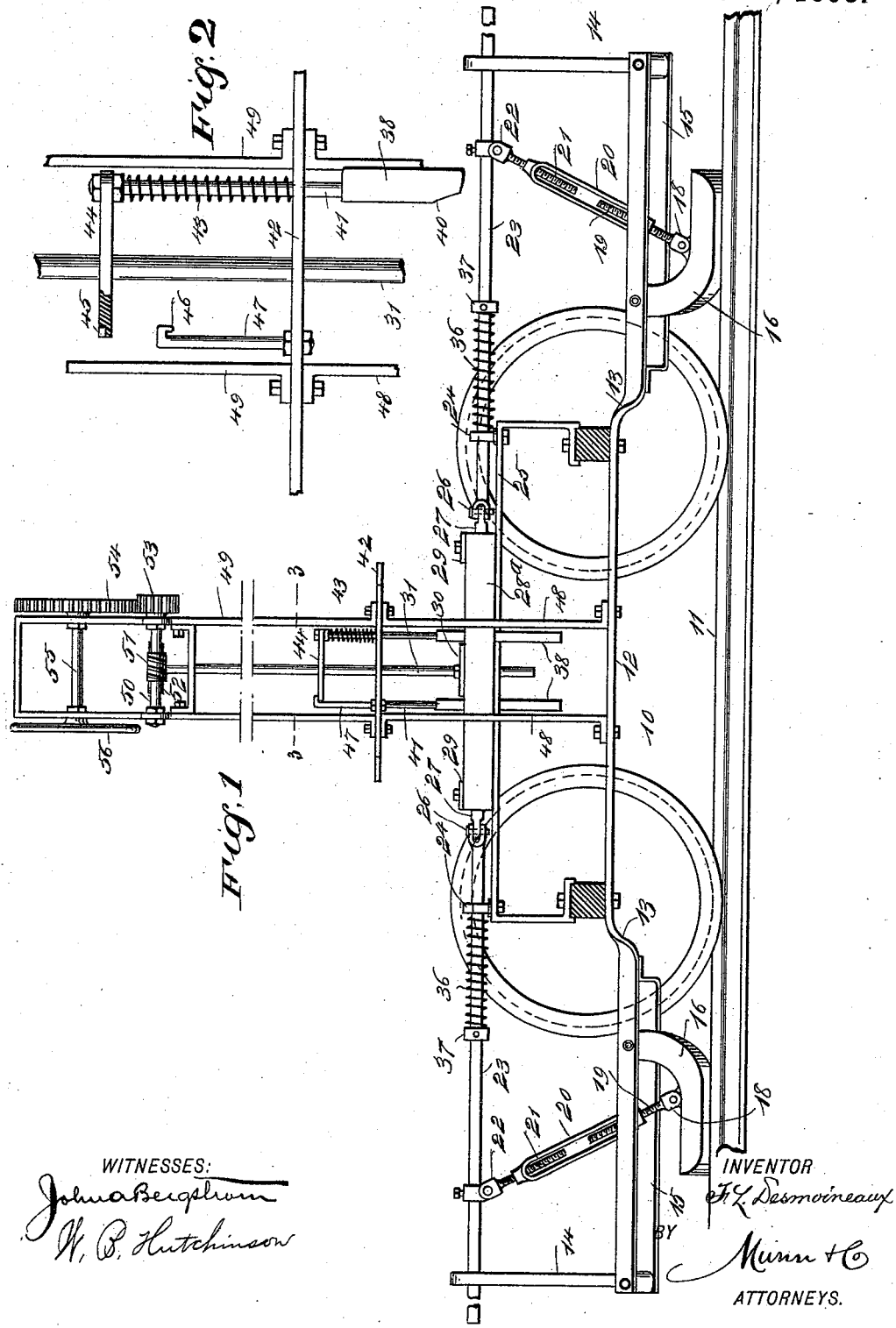

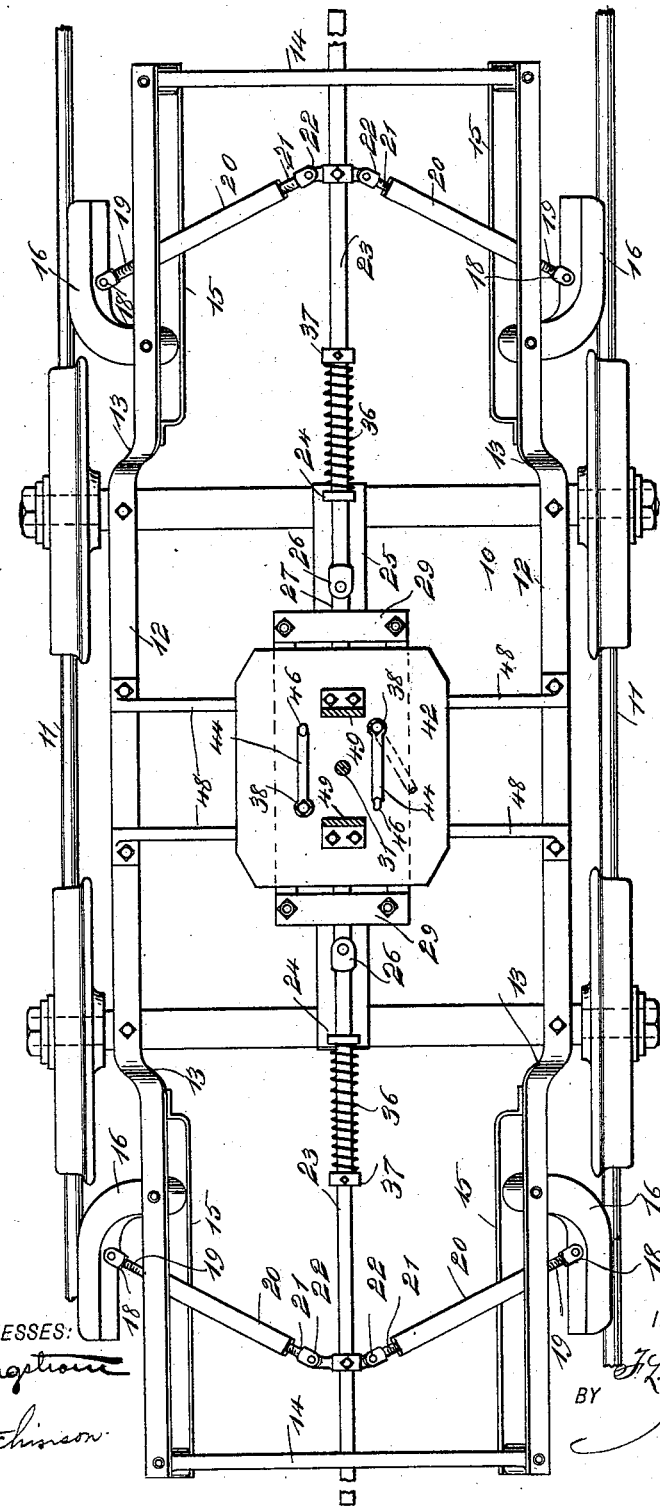

UNITED STATES PATENT OFFICE.

FREDERICK L. DESMOINEAUX, OF LAWSON, COLORADO.

RAIL-BRAKE.

SPECIFICATION forming part of Letters Patent No. 536,459, dated March 26, 1895.

Application filed May 14, 1894. Serial No. 511,216. (No model.)

*To all whom it may concern:*

Be it known that I, FREDERICK L. DESMOINEAUX, of Lawson, in the county of Clear Creek and State of Colorado, have invented a new and Improved Car-Brake, of which the following is a full, clear, and exact description.

My invention relates to improvements in car brakes; and the object of my invention is to produce a comparatively simple but very powerful brake, which may be applied to any ordinary car truck and which, when worked, applies the brake shoes to the rails instead of to the wheels, thus preserving the wheels, and which when applied may be made to stop the car as quickly as is desired.

A further object of my invention is to produce a brake which can be quickly and powerfully applied as specified, and also to arrange it in such a way that it may be instantly released when desired.

To these ends my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a sectional elevation of the brake embodying my invention, showing it applied to a truck. Fig. 2 is an enlarged detail view, partly in section, of the cam rod and connected mechanism which is used in applying and releasing the brakes. Fig. 3 is a sectional plan on the line 3—3 of Fig. 1. Fig. 4 is an end view of the brake and its working mechanism. Fig. 5 is an enlarged detail sectional plan of the brake setting racks and the mechanism for operating them; and Fig. 6 is a cross section on the line 6—6 of Fig. 5.

I have shown my improved brake as applied to a simple form of truck, but have not shown a car mounted on the truck, as this has nothing to do with my invention, and it will be understood that the car may be arranged in any ordinary manner. The truck 10 is shown mounted on rails 11 to which the brake shoes are applied, and extending longitudinally of the truck is a frame having flat side pieces 12 which are placed near opposite sides of the truck and are fastened securely to the axles. Near the axles the side pieces 12 are bent downward and twisted slightly, as shown at 13, thus bringing them into the right position to support the brake shoes, as described presently, and hold the shoes in a manner to be easily and effectively applied to the rail. The two side pieces 12 are connected at opposite ends by the inverted V-shaped braces 14 which give the necessary stability to the frame which also has guides for the brake rods, as hereinafter described.

The side pieces or bars 12 have on their under sides and at the ends, bars 15, which are held parallel with the bars 12 and a little below them, so as to form a way for the swinging shoes 16 which are pivoted between the side pieces or bars 12 and the bars 15, and are adapted to swing diagonally downward and outward, as shown in Figs. 1 and 4, and impinge on the rails 11, the faces of the shoes being shaped, as shown at 17 in Fig 4, so as to fit snugly against the rails and have the necessary friction.

The shoes 16 are pivotally connected, as shown at 18, with the screw rods 19 which enter turn buckles 20 projecting diagonally upward from the shoes, and the turn buckles connect with other screw rods 21 which are pivotally connected, as shown at 22, with the longitudinally sliding brake rods 23 which are arranged above the central portion of the truck, and at opposite ends thereof, so that when moved in one direction, the brake rods swing inward the upper ends of the connecting rods comprising the screw rods 19 and 21 and turn buckles 20 and force the brake shoes against the rails, and when moved in the opposite direction the brake rods have the reverse effect and raise the brake shoes from the rails.

The brake rods 23 slide in the braces 14 and also in guides 24 on the truss or frame 25, which is bolted to the truck axles, as shown clearly in Fig. 1, and the inner ends of the brake rods 23 are pivoted, as shown at 26, to the toothed racks 27 which slide on the plate 28 which is fastened centrally to the truss 25 and which has side pieces 28ª forming a sort of case or housing for the racks. The racks move longitudinally between the plate 28 and top plates 29 and 30, which are fastened to the side pieces 28ª, the center plate 30 serving also a guide for the brake shaft 31 which is arranged vertically and extends downward through the plate 28, the shaft being turned, as hereinafter described, and having on it a pinion 32 which is adapted to engage the racks 27. The racks 27 are held normally out of engagement with the pinion 32 by the arms 33, which are pivoted on the plate 28, as shown at 34, and are curved slightly to prevent their ends from engaging the teeth of the racks, these arms being pressed by springs 35, into close contact with the racks. The brake rods 23 are also spring-pressed so as to hold the shoes 16 out of engagement with the rails, this being effected by spiral springs 36 which encircle the rods 23 and are arranged between the guides 24 and collars 37 on the brake rods. The racks 27 are moved into engagement with the pinion 32 by cam rods 38 which are vertically arranged and move in slots 39 in the plate 28. See Fig. 5. These rods 38 have their lower ends tapered, as shown at 40, to enable them to enter with a wedge effect behind the racks 27, and the lower portion of the rods is preferably rectangular in cross section, while the upper portion terminates in a round section shank 41, which projects upward through the foot plate 42 on which a person may stand to operate the brake, which plate may be connected with any support on a car, the connection depending, of course, on the style of car.

The rods 38 are normally raised by springs 43 which encircle the rods above the foot plate and each rod has at its upper end a laterally extending foot piece 44 which is pivoted to the rod so as to swing thereon and has, preferably, a recessed end 45 to engage the catch 46 on the upper end of a rod 47 which is fastened to the foot plate 42. See Fig. 2. It will thus be seen that by placing the foot on the plate 44, the rod 38 may be depressed against the tension of its spring thus forcing the adjacent rack 27 into engagement with the pinion 32 and then, by swinging the foot plate into engagement with the catch 46 the rod may be locked down and the rack held in engagement with the pinion.

It will be seen that when the shaft 31 is turned and the racks 27 are in engagement with the pinion 32, the racks may be pulled in, thus moving the rods 23 against the tension of their springs 36 and swinging the shoes 16 firmly against the rails 11, the shoes being forced very securely to place by reason of the connection between each shoe and the rod 23, this connection being practically in the form of a toggle joint. The shaft 31 is turned from a countershaft 50, which is journaled in a frame 49 supported on the foot plate 42, the shaft 31 having a worm wheel 52 thereon which engages a worm 51 on the countershaft 50, and the latter has at one end a pinion 53 driven by a gear wheel 54 on a shaft 55 which is journaled parallel with the shaft 50 and has a hand wheel 56 by which it may be operated. It will thus be seen that by turning the hand wheel 56, the shaft 31 may be turned with great power and if the racks are in engagement with its pinion the brakes may be firmly set. To release the brakes it is only necessary to release the foot plates 44, as this permits the springs 43 to lift the rods 41, and when this is done, the springs 35 press the racks 27 out of engagement with the pinion 32 and the springs 36 then push out the rods 23 and raise the brake shoes from the rails.

The foot plate 42 is supported on standards 48 secured thereto and to the side pieces 12.

Having thus described my invention, I claim as new and desire to secure by Letters Patent—

1. The combination with the truck, of the swinging brake shoe thereon, the longitudinally movable spring pressed brake rods arranged above the central portion of the truck and connected with the shoes, and mechanism for moving the brake rods against their springs, substantially as described.

2. The combination with the truck, of the swinging brake shoes thereon, the longitudinally movable brake rods arranged above the central portion of the truck, mechanism for actuating the brake rods, and adjustable connecting rods extending downward and outward from the brake rods, to the brake shoes, substantially as described.

3. The combination, with the truck, the swinging shoes thereon, the longitudinally movable brake rod and an operative connection between the rods and shoes, of the sliding racks pivoted to the brake rods, the revoluble pinion between the racks, and mechanism for throwing the racks into and out of engagement with the pinion, substantially as described.

4. The combination, with the longitudinally movable brake rods and an operative connection between them and the brakes, of the sliding racks pivoted to the brake rods, the revoluble pinion between the racks, spring-pressed arms to force the racks out of engagement with the pinion, and means, as the cam rods, for moving the racks against the spring arms, substantially as described.

5. The combination, with the sliding and swinging racks and the revoluble pinion between the racks, of the depressible cam rods for moving the racks into engagement with the pinion, and a locking device to hold the cam rods depressed, substantially as described.

6. The combination, of the brake rods, the brakes operatively connected therewith, the racks for moving the brake rods, the revoluble shaft between the racks, mechanism for throwing the racks into and out of gear with the shaft, and a worm and gear mechanism for turning the shaft, substantially as described.

7. The combination, with the truck, of the longitudinal side pieces thereon, the shoes pivoted on the side pieces, the braces connecting the end portions of the side pieces, the brake rods held to slide in guides on the truck and on the said braces, and an operative connection between the brake rods and the shoes, whereby the shoes are set and released, substantially as described.

FREDERICK L. DESMOINEAUX.

Witnesses:
CHRISTIAN KEAGY,
FRANK. CARLSON.